United States Patent Office 3,163,655
Patented Dec. 29, 1964

3,163,655
METHYLOLATED-2-AMINOPYRIDINE 1-OXIDES
Donald Victor Maier, Charlotte, N.C., assignor to American Cyanamid Company, New York, N.Y., a corporation of Maine
No Drawing. Filed Dec. 27, 1961, Ser. No. 162,592
9 Claims. (Cl. 260—296)

This invention concerns a novel process for the preparation of a new class of substituted pyridine-N'-oxides which contain a methylolamino group. More particularly it relates to the manufacture of 2-methylolaminopyridine 1-oxides useful in the treatment of textile materials to improve the wearing quality and appearance of the fabric.

The novel compounds of the present invention, while having general utility as fiber reactive agents for the modification of the physical properties of textile materials, particularly are of value in the modification of the properties of cellulosic type textile materials. The present compounds which are characterized as having 2-methylolamino and alkylated methylolamino groups present therein exhibit a capacity for cross linking various cellulosic type textile fibers to impart thereby wrinkle resistance and stability to the said fibers.

It is a primary object of the present invention, therefore, to disclose as a new class of organic compounds 2-methylolaminopyridine 1-oxides of the type described.

It is a further object of the present invention to disclose a novel process for the preparation of 2-methylolaminopyridine 1-oxides which give the compounds in good yield without the formation of undesirable by-products.

It is a stillf urther object of the present invention to disclose a method of increasing the wrinkle resistance of cellulosic type fabrics by the application thereto of the novel 2-methylolated aminopyridine 1-oxides of our invention.

In the past it has been well known that aromatic amines when reacted with formaldehyde give certain methylolamino derivatives. For instance, the reaction of aniline with formaldehyde will yield anhydroformaldehydeaniline, dianilinomethane and the like. However, it has also been noted in the past that aromatic amines such as 2-aminopyridine fail to react to form methylolated aminopyridine derivatives. In these cases attempts at such reaction resulted in complex polymer formation. However, it has now been discovered by applicant that methylolated derivates of aminopyridine may be readily prepared by reacting 2-aminopyridine 1-oxides with an aldehyde in the presence of a known base sufficient to elevate the pH of the reaction products substantially above neutrality to obtain a novel class of 2-methylolaminopyridine 1-oxides suitable for treatment of textile products. In this reaction the temperature conditions are such that the reaction may be conducted either at room temperature or slightly above room temperature. The reaction may be represented schematically by the following equation:

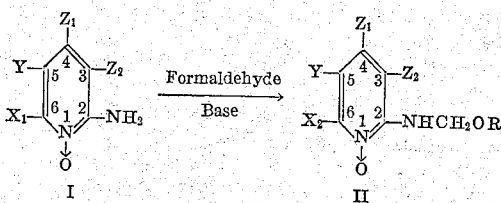

I            II

In the above reaction 2-aminopyridine 1-oxides (I) of the general type indicated are reacted with formaldehyde to obtain the methylolaminopyridine 1-oxides (II) of the present invention. In the 2-substituted pyridine 1-oxides illustrated $X_1$ represents a substituent selected from the group consisting of hydrogen, lower alkyl or amino; $X_2$ represents a member of the group consisting of hydrogen, lower alkyl, amino and methylolamino; Y represents a substituent selected from the group consisting of hydrogen, lower alkyl and halogen, while $Z_1$ and $Z_2$ represent a substituent selected from the group consisting of hydrogen and lower alkyl, and R represents hydrogen or lower alkyl. The symbol shown extending from the ring nitrogen to the oxygen atom represents a dative bond or a coordinate covalent bond. The reference to the nitrogen atom in the ring will be 1 in this specification to distinguish it from any other nitrogen atoms present in the molecule.

Among the many known 2-aminopyridine 1-oxides which may be embloyed as starting materials for our reaction one may include those such as 2,6-diaminopyridine 1-oxide; 3,4,5,6-tetramethyl-2-aminopyridine 1-oxide; 4,6-dimethyl-2-aminopyridine 1-oxide; 5-bromo-2-aminopyridine 1-oxide and the like.

The new 2-methylolaminopyridine 1-oxides of our invention may be depicted by the structure:

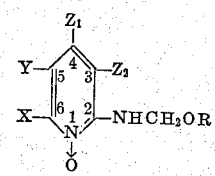

and includes isomers, analogs, and salts thereof, wherein X represents a substituent selected from the group consisting of hydrogen, lower alkyl, methylolamino, amino and lower alkoxymethylamino; Y represents a substituent selected from the group consisting of hydrogen, lower alkyl and halogen; $Z_1$ and $Z_2$ represent a substituent selected from the group consisting of hydrogen and lower alkyl; and R represents a substituent selected from the group consisting of hydrogen and lower alkyl. In the definition of the above compounds, the term halogen is intended to refer to chlorine and bromine preferably, although the other well known halogenated derivatives such as iodine and flourine may also be obtained. The term lower alkyl as it is employed to define the alkyl substituents in the molecule is intended to refer to those aliphatic alkyl hydrocarbon radicals having from about $C_2$ to $C_8$ carbon atoms in the chain which may be either normal or branched in its conformation.

The general preparation of our novel compounds will involve a reaction of a 2-aminopyridine 1-oxide with formaldehyde in an aqueous medium at a pH between about pH 8 and pH 10. The reaction is generally conducted at room temperature or slightly elevated temperatures when it is desired to hasten the rate of reaction. The alkaline reacting conditions are obtained by the addition of common bases such as sodium hydroxide, potassium hydroxide, sodium carbonate and the like. The completion of the reaction can be determined by analysis for unreacted formaldehyde. The methylolated-2-aminopyridine 1-oxide product of the reaction after it has been prepared may be isolated by any convenient recovery procedure such as crystallization from a solvent or combination of organic solvents or any other conventional techniques of purification. The methylolated-2-aminopyridine 1-oxides formed by the aforesaid reaction may be further alkylated by reaction with an aliphatic alcohol in the presence of an organic acid if desired.

In this alkylation any of the lower alcohols up to about 4 carbon atoms may be employed to prepare alkylated derivatives of the products of our reaction. Although the alkylation step is conducted preferably by the use of lower alcohols where water-soluble products are desired higher alcohols may also be employed with the result that the products formed are less water soluble. It is convenient in most alkylation reactions to employ an excess of the alcohol as the reaction medium thereby obtaining a desirable yield of the alkylated derivative in the said alkylation reaction. Any of the well known inorganic acids such as hydrochloric, nitric, sulfuric and the like or the stronger organic acids both mono and dicarboxyclic in nature may be employed with equally good results.

Some of the methods of preparation of our novel compounds will be more particularly illustrated in the several following examples of some illustrative preparations of members of our series of new compounds which it must be remembered are described for purposes of illustration only. It is our express intention that the examples be only exemplary of the invention and not definite of its scope. The scope of the concept embodied herein may only be determined by reference to the language in the several appended claims. In the following examples the parts and percentages are by weight.

EXAMPLE 1

2-Methylolaminopyridine 1-Oxide

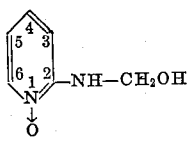

Slowly add a solution of 11.0 parts (0.1 mole) of 2-aminopyridine 1-oxide in 16 parts of water with stirring to 16.2 parts (0.2 mole) of 37 percent formalin. Adjust the pH to 9.0 with sodium hydroxide. Let the reaction mixture stand overnight. Remove water by distillation in vacuo. Triturate the residual oil with a mixture of ethyl acetate and ethyl alcohol. Filter off the crystalline product and wash with the solvent mixture and then with ether, and dry to obtain the product of this example which melts at about 200° C. with decomposition.

*Analysis.*—Calcd. for $C_6H_8N_2O_2$: formaldehyde, 21.4 and N 20.0. Found: N, 20.2; formaldehyde, 21.8.

EXAMPLE 2

2,6-Bis (Methylolamino) Pyridine 1-Oxide

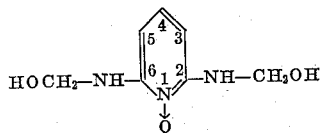

To a solution of 11.2 parts (0.0895 mole) of 2,6-diaminopyridine 1-oxide in 30 parts of water, add 29.1 parts (0.358 mole) of 37 percent formalin, the latter having the pH adjusted to 9.0 with sodium hydroxide. After about one hour, filter off the reaction product, wash with water, ethanol and then with ether, and dry to obtain the product of this example.

*Analysis.*—Calcd. for $C_7H_{11}N_3O_3$: C, 45.5; N, 22.7; formaldehyde, 32.4. Found: C, 45.6; N, 22.8; formaldehyde, 32.3.

EXAMPLE 3

2,6-Bis(Methoxymethylamino)Pyridine 1-Oxide

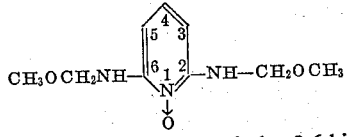

Stir a solution of 10.0 parts of the 2,6-bis(methylolamino)pyridine 1-oxide product of Example 2 in 95 parts of absolute methyl alcohol and about 4.7 parts of concentrated hydrochloric acid at room temperature for about 45 minutes. Neutralize the solution with sodium hydroxide and filter to remove insoluble salts. The solution of the product then occupies a volume equivalent to 150 parts of water. The solution contains about 7.5 percent of the product of this example.

EXAMPLE 4

5-Bromo-2-Methylolaminopyridine 1-Oxide

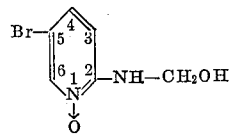

(A) A 2-amino-5-bromopyridine 1-oxide starting material may be prepared as follows. To a solution of 15.0 parts (0.696 mole) of 2-acetamido-5-bromo-pyridine in 100 parts of acetic acid, add 10.0 parts of 40 percent peracetic acid dissolved in 10 parts of glacial acetic acid at a temperature of 60° C. After a reaction period of one hour at 60–70° C., cool the mixture. The unreacted peracetic acid is destroyed with solid sodium sulfite. Add the sulfite until a blue color is no longer obtained when the reaction mixture is tested with acidified starch-iodide test paper. Remove the acetic acid by distillation in vacuo, and crystallize the residue from alcohol. The intermediate product, 2-acetamido-5-bromo-pyridine 1-oxide, obtained melts at 165–168° C.

*Analysis.*—Calcd. for $C_7H_7N_2O_2Br$: C, 36.4; N, 12.1; Br, 34.6. Found: C, 36.7; N, 12.1; Br, 33.7.

(B) Reflux a solution of 15.0 parts (0.065 mole) of 2-acetamido-5-bromopyridine 1-oxide of part A above and 3.0 parts (0.075 mole) of sodium hydroxide in 200 parts of water for about 4 hours. Separate the intermediate product, 2-amino-5-bromopyridine 1-oxide, from the cooled reaction mixture by filtration. The melting point is about 184° C.

*Analysis.*—Calcd. for $C_5H_5N_2Br$: C, 31.8; N, 14.8; Br, 42.3. Found: C, 31.7; N, 14.7; Br, 42.5.

(C) To a solution of 1.22 parts (0.00645 mole) of 2-amino-5-bromopyridine 1-oxide of part B of this example in 30 parts of water and sufficient sodium hydroxide to give a pH of about 9.0, add 1.05 parts (0.013 mole) of 37 percent formalin. After about 30 minutes' reaction at ambient temperature, filter the reaction mixture to obtain the product of this example which melts at 230°–235° C.

*Analysis.*—Calcd. for $C_6H_7N_2O_2Br$: C, 32.9; H, 3.19; N, 12.8. Found: C, 32.4; H, 3.15; N, 12.6.

EXAMPLE 5

4-Methyl-2-Methylolaminopyridine 1-Oxide

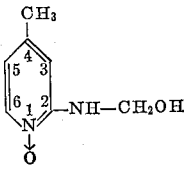

Proceed as directed in Example 1 except substitute an equivalent amount of 2-amino-4-methylpyridine 1-oxide for the 2-aminopyridine 1-oxide of that example to obtain the product of this example.

EXAMPLE 6

Pad cotton percale (80 x 80) through an aqueous solution of the product of Example 1 and magnesium chloride (12 percent on the weight of the methylol compound). Dry the impregnated fabric, containing 1.0 percent o.w.f. of the methylolated compound at 225° F. for 2 minutes. Initially the treated fabric contains about 0.22 percent nitrogen, and after five washes in an automatic washing machine with soap and water at 140° F., the fabric contains about 0.11 percent nitrogen. (Theory is 0.22 percent nitrogen.) These results indicate that a large proportion of the methylol compound is firmly bound to the fabric.

EXAMPLE 7

Pad cotton percale (80 x 80) through an aqueous solution of the product of Example 3 and magnesium chloride (12 percent on the weight of the methylol compound). Dry the impregnated fabric containing 6.37 percent of the methylated dimethylol compound at 225° F. and cure for 1.5 minutes at 350° F.

Measure the wrinkle recovery of the treated and untreated fabrics by the tentative test method 66–1959, set forth on page 165 of the 1960 "Technical Manual of the American Association of Textile Chemists and Colorists," volume 36.

Measure the tensile strength of the above treated fabric on a Scott tester by the ASTM method.

The treated fabric will show a wrinkle recovery of 214° (total for wrap and fill) and a tensile strength of 88 pounds. The wrinkle recovery and tensile strength of a comparable untreated fabric is 150° and 102 pounds, respectively.

In the preceding examples it is to be understood that in those cases where an insufficient amount of formaldehyde is employed to effect dimethylolation i.e. less than about 2 moles of formaldehyde, in some cases, the X substituent would represent an amino group, the remaining substituents being as above indicated.

I claim:

1. 2-methylolaminopyridine 1-oxides of the formula:

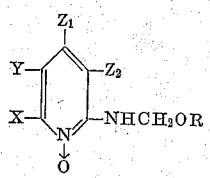

wherein X represents a substituent selected from the group consisting of hydrogen, amino, lower alkyl, methylolamino and lower alkoxymethylamino; Y represents a substituent selected from the group consisting of hydrogen, lower alkyl or halogen; $Z_1$ and $Z_2$ are substituents selected from the group consisting of hydrogen and lower alkyl and R is a substituent selected from the group consisting of hydrogen and lower alkyl.

2. 2-methylolaminopyridine 1-oxide.
3. 2,6-bis(methylamino)pyridine 1-oxide.
4. 2,6-bis(methoxymethylamino)pyridine 1-oxide.
5. 5-bromo-2-methylolaminopyridine 1-oxide.
6. 4-methyl-2-methylolaminopyridine 1-oxide.

7. A method for preparing substituted 2-methylolaminopyridine 1-oxides of the formula:

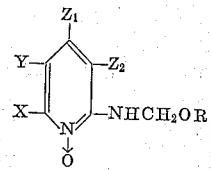

wherein X represents a substituent selected from the group consisting of hydrogen, lower alkyl, methylolamino, amino and lower alkoxymethylamino; Y represents a substituent selected from the group consisting of hydrogen, lower alkyl and halogen; $Z_1$ and $Z_2$ are substituents selected from the group consisting of hydrogen and lower alkyl and R is a substituent selected from the group consisting of hydrogen and lower alkyl which comprises reacting a 2-aminopyridine 1-oxide of the formula:

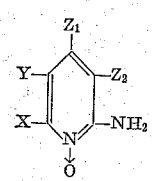

wherein X represents a substituent selected from the group consisting of hydrogen, lower alkyl and amino; Y represents a substituent selected from the group consisting of hydrogen, lower alkyl and halogen; and $Z_1$ and $Z_2$ represent a substituent selected from the group consisting of hydrogen and lower alkyl, with an aldehyde in the presence of a strong base and recovering the product formed.

8. A method according to claim 7 wherein the aldehyde reacted is formaldehyde and the strong base is an alkali metal hydroxide.

9. A method for preparing 2-methylolaminopyridine 1-oxide which comprises reacting molar equivalent quantities of 2-aminopyridine 1- oxide with formalin in the presence of a strong base and recovering the product prepared thereby.

References Cited in the file of this patent
UNITED STATES PATENTS

| | | |
|---|---|---|
| 2,416,151 | Boulton | Feb. 18, 1947 |
| 2,489,777 | Horclois | Nov. 29, 1949 |
| 2,493,381 | Balassa | Jan. 3, 1950 |
| 2,662,891 | Sperber | Dec. 15, 1953 |